(12) United States Patent
Ohno et al.

(10) Patent No.: US 12,379,323 B2
(45) Date of Patent: Aug. 5, 2025

(54) OPTICAL INSPECTION METHOD, NON-TRANSITORY STORAGE MEDIUM STORING OPTICAL INSPECTION PROGRAM, PROCESSING DEVICE, AND OPTICAL INSPECTION APPARATUS

(71) Applicant: KABUSHIKI KAISHA TOSHIBA, Tokyo (JP)

(72) Inventors: Hiroshi Ohno, Tokyo (JP); Hiroya Kano, Kanagawa (JP); Hideaki Okano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 528 days.

(21) Appl. No.: 17/823,780

(22) Filed: Aug. 31, 2022

(65) Prior Publication Data
US 2023/0314335 A1    Oct. 5, 2023

(30) Foreign Application Priority Data

Mar. 17, 2022 (JP) ................ 2022-042560

(51) Int. Cl.
*G01N 21/88* (2006.01)
*G01N 21/01* (2006.01)
*G01N 21/41* (2006.01)

(52) U.S. Cl.
CPC ......... *G01N 21/8851* (2013.01); *G01N 21/01* (2013.01); *G01N 21/41* (2013.01); *G01N 21/8806* (2013.01); *G01N 2021/8845* (2013.01)

(58) Field of Classification Search
CPC .... G01N 21/8851; G01N 21/01; G01N 21/41; G01N 21/8806; G01N 2021/8845; G01N 2021/9518; G01N 21/9515
See application file for complete search history.

(56) References Cited

U.S. PATENT DOCUMENTS

| 7,395,606 | B2 * | 7/2008 | Crampton | ............... G01B 5/008 |
| | | | | 33/503 |
| 9,217,713 | B1 * | 12/2015 | Safai | ................... G01N 21/8806 |
| 10,269,108 | B2 * | 4/2019 | Wang | ............... G05B 19/41875 |
| 10,580,125 | B2 * | 3/2020 | Wang | ................. G01N 21/9515 |

(Continued)

FOREIGN PATENT DOCUMENTS

| CN | 109146082 A | * | 1/2019 | ........... B25J 19/023 |
| JP | 2001-88073 A | | 4/2001 | |

(Continued)

OTHER PUBLICATIONS

W.L. Howes "Rainbow schlieren and its applications," Applied Optics, vol. 23, No. 14, pp. 2449-2460 (1984).

(Continued)

*Primary Examiner* — Roy M Punnoose
(74) *Attorney, Agent, or Firm* — Finnegan, Henderson, Farabow, Garrett & Dunner, LLP

(57) ABSTRACT

According to an embodiment, an optical inspection method includes calculating irradiation field information concerning an irradiation field on a surface of a subject when irradiating the surface of the subject with a light beam from an illumination device that is supported by a movable body and moved; and performing path calculation processing of calculating, based on the irradiation field information, a path for the illumination device to move.

14 Claims, 10 Drawing Sheets

(56) References Cited

U.S. PATENT DOCUMENTS

| | | | |
|---|---|---|---|
| 10,726,543 B2* | 7/2020 | Bian | G01N 21/8851 |
| 10,732,102 B2 | 8/2020 | Ohno et al. | |
| 10,812,786 B2 | 10/2020 | Ohno et al. | |
| 11,080,843 B2* | 8/2021 | Inazumi | H04N 23/90 |
| 12,136,238 B2* | 11/2024 | Sugiyama | G06T 7/40 |
| 2004/0202351 A1* | 10/2004 | Park | G05D 1/0234 |
| | | | 382/104 |
| 2008/0140321 A1* | 6/2008 | Blanc | B25J 9/1674 |
| | | | 702/41 |
| 2012/0232738 A1* | 9/2012 | Jeon | G05D 1/0219 |
| | | | 701/25 |
| 2016/0084633 A1* | 3/2016 | Ferrari | G01B 5/008 |
| 2018/0321161 A1* | 11/2018 | Okada | G01B 21/045 |
| 2019/0073760 A1* | 3/2019 | Wang | G06T 7/001 |
| 2019/0281213 A1* | 9/2019 | Kato | B25J 9/1664 |
| 2021/0190678 A1* | 6/2021 | Tsuji | G01N 21/8806 |

FOREIGN PATENT DOCUMENTS

| | | |
|---|---|---|
| JP | 2008-209726 A | 9/2008 |
| JP | 2009-14357 A | 1/2009 |
| JP | 2019-124542 A | 7/2019 |
| JP | 2019-203796 A | 11/2019 |
| JP | 2020-134221 A | 8/2020 |

OTHER PUBLICATIONS

Jun-Sik Kim et al., "Multiaperture telecentric lens for 3D reconstruction," Optics Letters, vol. 36, No. 7, pp. 1050-1052 (2011).

D. Evangelista et al., "Flexible and reconfigurable robotic inspection in manufacturing, " 2020 I-RIM Conf., DOI:10.5281/zenodo. 4781174, 2 pages (2019).

H. Ohno, "One-shot color mapping imaging system of light direction extracted from a surface 8RDF," OSA Continuum, vol. 3, No. 12, pp. 3343-3350 (2020).

Japan Patent Office, Office Action in JP App. No. 2022-042560, 3 pages, and machine translation, 3 pages (Nov. 12, 2024).

* cited by examiner

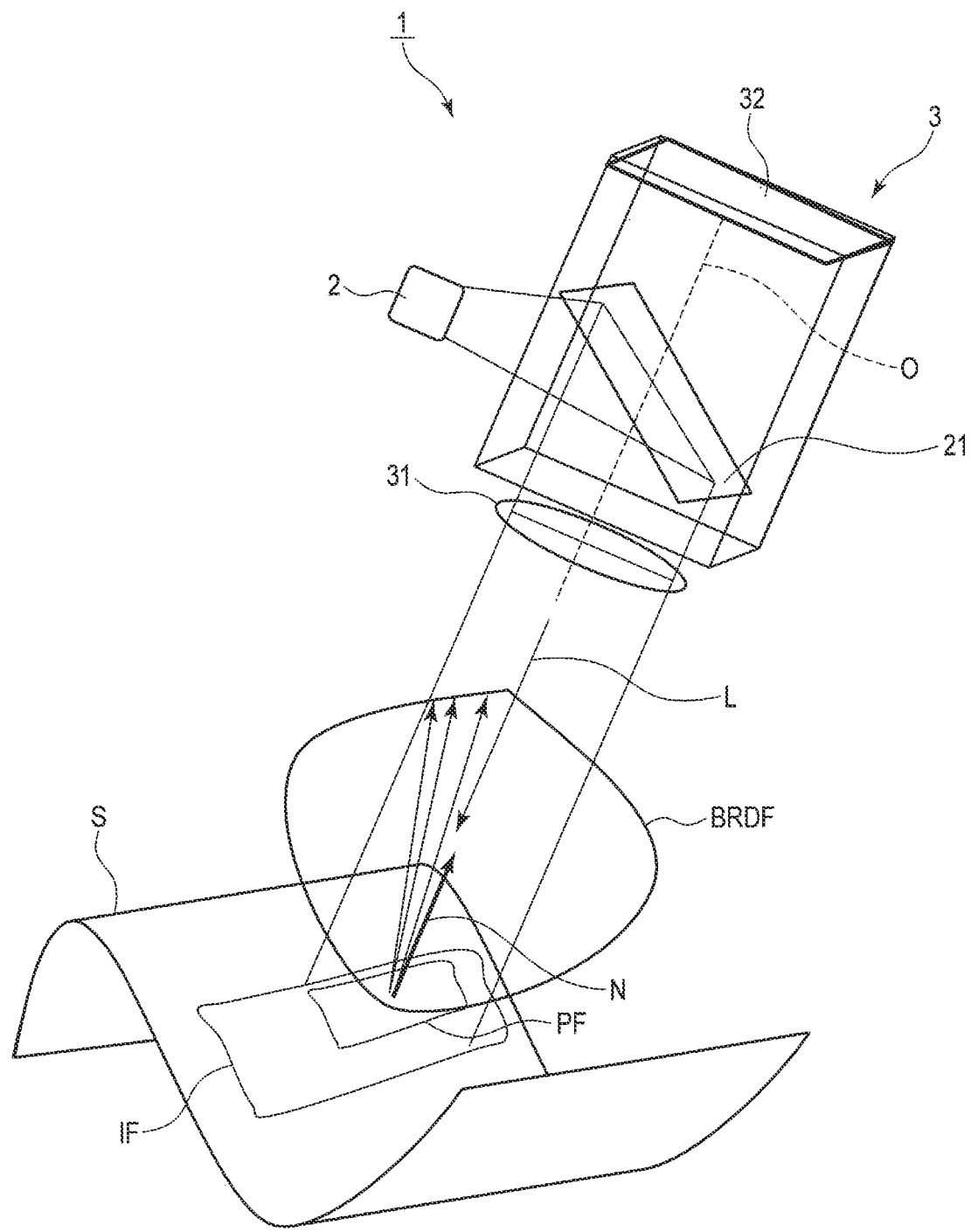
F I G. 10

OPTICAL INSPECTION METHOD, NON-TRANSITORY STORAGE MEDIUM STORING OPTICAL INSPECTION PROGRAM, PROCESSING DEVICE, AND OPTICAL INSPECTION APPARATUS

CROSS-REFERENCE TO RELATED APPLICATIONS

This application is based upon and claims the benefit of priority from Japanese Patent Application No. 2022-042560, filed Mar. 17, 2022, the entire contents of all of which are incorporated herein by reference.

FIELD

Embodiments described herein relate generally to an optical inspection method, a non-transitory storage medium storing an optical inspection program, a processing device, and an optical inspection apparatus.

BACKGROUND

There is a method in which a robot with a camera attached thereon is moved, and a surface of a subject, which has a complex shape, is scanned by the camera, thereby optically inspecting the presence/absence of a flaw or the like on the surface of the subject.

BRIEF DESCRIPTION OF THE DRAWING(S)

FIG. 10 is a schematic view showing an optical inspection apparatus according to the second embodiment.

DETAILED DESCRIPTION

It is an object of an embodiment to provide an optical inspection method capable of performing, in surface inspection of a subject, optical inspection without oversight (image missing) in a desired range, a non-transitory storage medium storing an optical inspection program, a processing device, and an optical inspection apparatus.

According to the embodiment, an optical inspection method includes calculating irradiation field information concerning an irradiation field on a surface of a subject when irradiating the surface of the subject with a light beam from an illumination device that is supported by a movable body and moved; and performing path calculation processing of calculating, based on the irradiation field information, a path for the illumination device to move.

Several embodiments will now be described with reference to the accompanying drawings.

First Embodiment

An optical inspection apparatus 1 according to the first embodiment will be described with reference to FIGS. 1, 2, 3, 4, 5, 6, 7, and 8. Imaging will be handled as a synonym to photographing hereinafter.

Figure 1:
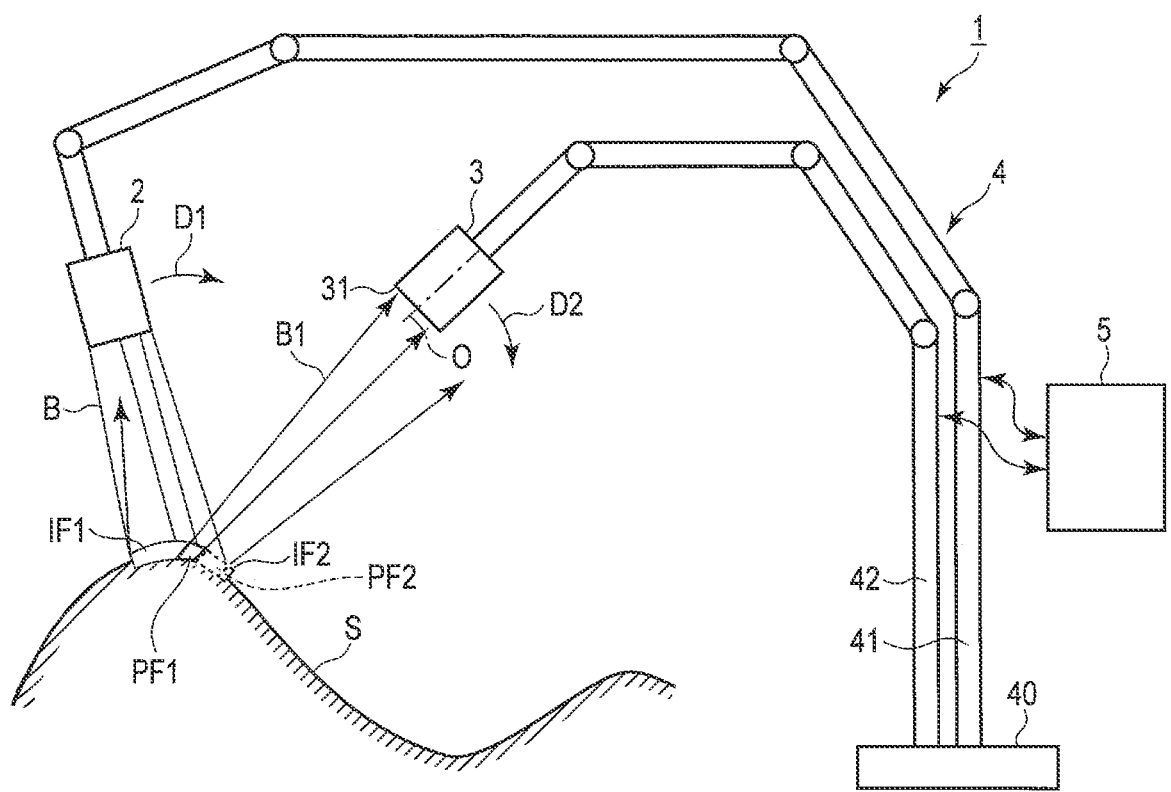
FIG. 1 is a schematic view showing an optical inspection apparatus according to the first embodiment.
Figure 2:
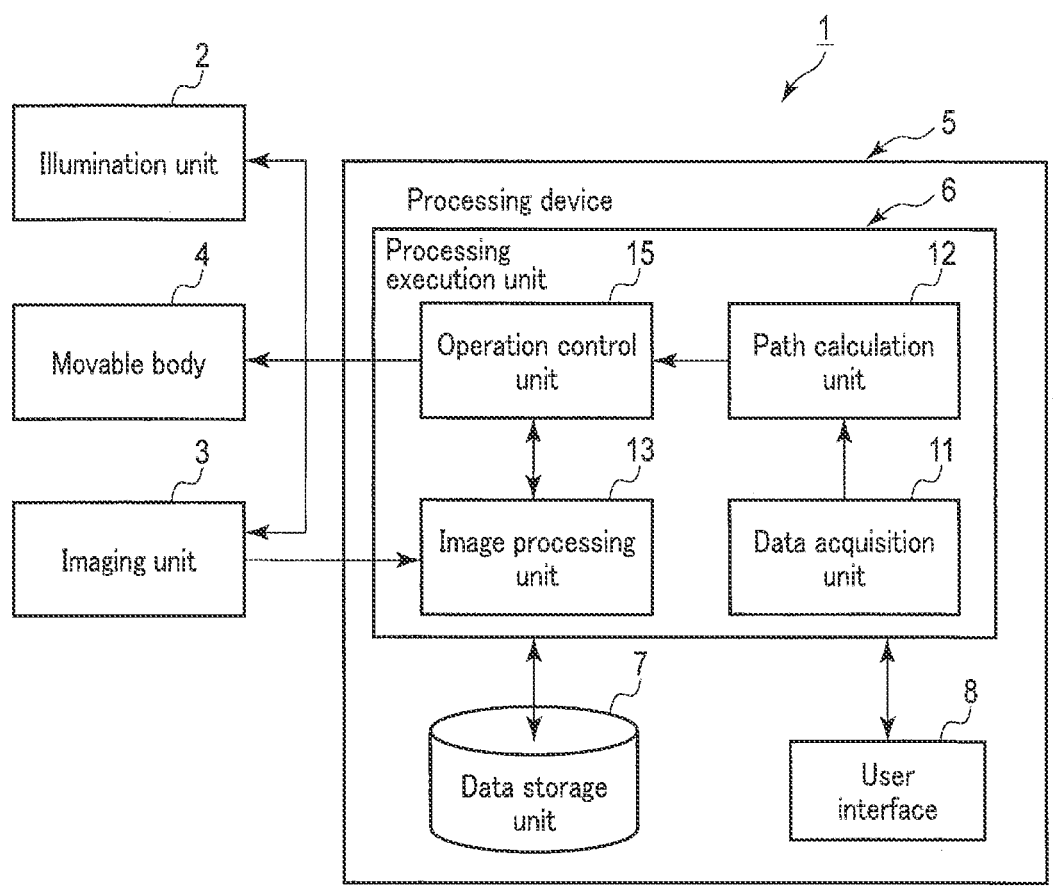
FIG. 2 is a schematic block diagram of the optical inspection apparatus according to the first embodiment.

FIG. 1 is a view schematically showing the optical inspection apparatus 1 according to the first embodiment. FIG. 2 is a block diagram schematically showing the control system and the like of the optical inspection apparatus 1 according to this embodiment. As shown in FIGS. 1 and 2, the optical inspection apparatus 1 according to this embodiment is used for optical inspection of the surface of a subject (object) S as an inspection target. In one inspection, optical inspection is performed for a certain range of the surface of the subject S using the optical inspection apparatus 1. In an example, the whole surface of the subject S may be inspected by one inspection. In another example, only a predetermined range (part) of the surface of the subject S may be inspected by one inspection. The entire surface of the subject S may be set to the predetermined range. That is, the entire surface of the subject S may be set to the predetermined range, or a part of the surface of the subject S may be set to the predetermined range.

The optical inspection apparatus 1 includes an illumination portion (illumination device) 2, an imaging portion (imaging device) 3, a movable body 4, and a processing device 5.

The processing device 5 includes a processing execution portion 6, a data storage unit 7, and a user interface 8. The processing execution portion 6 includes a data acquisition portion 11, a path calculation portion 12, an image processing portion 13, and an operation controller 15.

The illumination portion 2 emits a light beam B toward the surface of the subject S. The light beam B is an electromagnetic wave such as X-rays, ultraviolet rays, visible light, infrared rays, far infrared rays, or a microwave. Here, the light beam B is, for example, visible light, and the wavelength region is set to 400 nm to 800 nm. In this embodiment, the illumination portion 2 uses, for example, an LED, and emits the light beam B in a desired direction. The light beam B from the illumination portion 2 appropriately illuminates a predetermined range of the surface of the subject S. If the light beam B from the illumination portion 2 strikes the surface of the subject S, the region where the light beam B strikes will be referred to as an irradiation field IF.

The imaging portion 3 captures the inside of the irradiation field where the surface of the subject S is irradiated with the light beam from the illumination portion 2, thereby acquiring an image. The imaging portion 3 is an imaging device such as a camera. The imaging portion 3 acquires a light beam (reflected light) B1 that has entered there, which is the light beam emitted from the illumination portion 2 and reflected by the surface of the subject S. In a case where the light beam (reflected light) B1 reflected by the irradiation field IF on the surface of the subject S enters an imaging opening 31 of the imaging portion 3 within an angle of view where an image can be captured, a region of the surface of the subject S where the light beam is reflected will be referred to as an imaging irradiation field PF1. Also, of the surface of the subject S, the entire region that can be acquired as an image by the imaging portion 3 will be simply referred to as an imaging region. That is, the region will be referred to as an imaging region, including a region that is dark in the acquired image because it is outside the illumination. The shape of the imaging opening 31 is decided by the imaging portion 3. For example, if the imaging optical element provided in the imaging portion 3 is a lens with an effective diameter φ of 40 mm, the imaging opening 31 has a disc shape with a diameter φ of 40 mm. The light beam that has entered the imaging opening 31 is formed into an image on an image sensor by the optical element of the imaging portion 3, and acquired as an image by the image sensor. Then, the imaging portion 3 of the optical inspection apparatus 1 according to this embodiment captures the imaging irradiation field PF1 within the range of the irradiation field IF where the subject S is illuminated.

Imaging, that is, acquisition of an image by the imaging portion 3 is done by exposure of the image sensor. The exposure is performed by the imaging shutter of the imaging portion 3. Note that the imaging shutter may be electrical or mechanical. However, the present invention is not limited to this, and the image can also be acquired by turning on/off the illumination of the illumination portion 2 and exposing the image sensor of the imaging portion 3, instead of using the imaging shutter of the imaging portion 3. In this case, if the illumination of the illumination portion 2 is turned on to illuminate a predetermined position of the subject S, the image is acquired by the image sensor of the imaging portion 3.

In the image sensor, a plurality of pixels each configured to convert light into an electrical signal are arrayed and, for example, an area sensor or a line sensor is formed depending on the shape of the array. Each pixel has a plurality of channels for receiving different wavelength spectra. However, the present invention is not limited to this, and each pixel may have one channel for receiving one wavelength spectrum.

The movable body 4 is controlled by the processing device 5. The movable body 4 includes, for example, a robot arm with one or more joints, and one of a linear motion mechanism and a parallel link mechanism. In this embodiment, the movable body 4 includes a base 40, a first robot 41 configured to arrange the illumination portion 2 at a desired position in a desired orientation within a predetermined range, and a second robot 42 configured to arrange the imaging portion 3 at a desired position in a desired orientation within a predetermined range.

The first robot 41 of the movable body 4 is mechanically connected to the illumination portion 2. As for the first robot 41, in an example shown in FIG. 1, one end of the first robot 41 is supported on the base 40, and a connecting portion to the illumination portion 2 is formed at the other end. If the first robot 41 operates, the position and orientation of the illumination portion 2 change within a predetermined range. The first robot 41 maintains the illumination portion 2 at the predetermined position and orientation within the predetermined range. Hence, the position and orientation of the illumination portion 2 change in correspondence with the operation of the first robot 41.

The illumination portion 2 moves along, for example, a first scan path D1. The first scan path D1 may be, for example, a one-dimensional path to move in a one-axis direction, a two-dimensional path to move along one plane, or a three-dimensional path to move along one curved surface. At any rate, the scan path is a line or a curve. Also, a scan direction at an arbitrary point is a direction vector along the scan path at that point. In this embodiment, the position and orientation of the first robot 41 are represented by, for example, a position and orientation in a three-dimensional space.

The irradiation field IF of the subject S by the illumination portion 2 variously changes depending on the surface shape of the subject S, For example, a first irradiation field IF1 at a given position of the surface of the subject S changes to a second irradiation field IF2 different from the first irradiation field IF1 by the movement of the illumination portion 2. For this reason, the illumination portion 2 of the optical inspection apparatus 1 according to this embodiment is used as a so-called active illumination.

The second robot 42 of the movable body 4 is mechanically connected to the imaging portion 3. As for the second robot 42, in an example shown in FIG. 1, one end of the second robot 42 is supported on the base 40, and a connecting portion to the imaging portion 3 is formed at the other end. If the second robot 42 operates, the position and orientation of the imaging portion 3 change within a predetermined range. The second robot 42 maintains the imaging portion 3 at the predetermined position and orientation within the predetermined range. Hence, the position and orientation of the imaging portion 3 change in correspondence with the operation of the second robot 42.

The imaging portion 3 moves along, for example, a second scan path D2 different from the first scan path D1. The second scan path D2 may be, for example, a one-dimensional path to move in a one-axis direction, a two-dimensional path to move along one plane, or a three-dimensional path to move on a curved surface. That is, the scan path is a line or a curve. In this embodiment, the position and orientation of the second robot 42 are represented by, for example, a position and orientation in a three-dimensional space.

The irradiation field or the imaging region of the subject S by the imaging portion 3 variously changes depending on the surface shape of the subject S. For example, the first imaging irradiation field PF1 at a given position of the surface of the subject S changes to an imaging irradiation field PF2 different from the first imaging irradiation field PF1 by the movement of the illumination portion 2 and the imaging portion 3.

A point on an object surface captured by the imaging portion 3 will be referred to as an imaging point hereinafter.

The arrangement of the first robot 41 and the second robot 42 with respect to the base 40 can appropriately be set.

The processing device 5 is formed by, for example, a computer or the like, and includes a processor (processing circuit) and a non-transitory storage medium. The processor includes one of a CPU (Central Processing Unit), an ASIC (Application Specific Integrated Circuit), a microcomputer, an FPGA (Field Programmable Gate Array), and a DSP (Digital Signal Processor). In addition to a main storage device such as a memory, the non-transitory storage medium can include an auxiliary storage device. As the non-transitory storage medium, a magnetic disk, an optical disk (a CD-ROM, a CD-R, a DVD, or the like), a magnetooptical disk (an MO or the like), a semiconductor memory, or the like can be used.

In the processing device 5, only one processor and one storage medium may be provided, or a plurality of processors and a plurality of storage media may be provided. In the processing device 5, the processor executes a program and the like stored in the non-transitory storage medium, thereby performing processing. The program executed by the processor of the processing device 5 may be stored in a computer (server) connected to the processing device 5 via a network such as the Internet, or a server in a cloud environment. In this case, the processor downloads the program via the network. In the processing device 5, processes (to be described later) by the processing execution portion 6 including the data acquisition portion 11, the path calculation portion 12, the image processing portion 13, and the operation controller 15 are executed by the processor and the like, and the non-transitory storage medium functions as the data storage unit 7.

Note that the optical inspection apparatus 1 may be provided with a plurality of processing devices (computers) that are different from each other. In this case, each of the plurality of processing devices includes a processor and a storage medium. Processes (to be described later) by the processing execution portion 6 are executed by the processors of the plurality of processing devices. In an example, processes (to be described later) by the data acquisition portion 11 and the path calculation portion 12 are executed by the processor of a certain processing device. In addition, processes (to be described later) by the image processing portion 13 and the operation controller 15 are executed by the processor of a processing device different from the processing device that executes the processes by the data acquisition portion 11 and the path calculation portion 12.

In addition, at least part of the processing by the processing execution portion 6 may be executed by a cloud server constituted in a cloud environment. The infrastructure of the cloud environment is formed by a virtual processor such as a virtual CPU and a cloud memory. In an example, processes by the data acquisition portion 11 and the path calculation portion 12 are executed by the virtual processor, and the cloud memory functions as the data storage unit 7. Processes by the image processing portion 13 and the operation controller 15 are executed by the processor of the processing device such as a computer. The data storage unit 7 may be provided in a computer different from the processing device 5 including the processing execution portion 6. In this case, the processing device 5 is connected, via a network, to the computer including the data storage unit 7 and the like.

In addition, the user interface 8 includes an operation portion through which an operation instruction is input by an operator or the like in inspection using the optical inspection apparatus 1, and a notification portion configured to notify the operator or the like of information associated with the inspection. The notification portion notifies information by, for example, one of screen display and a voice. Note that the user interface 8 may be provided independently of the processing device 5.

Each of the first robot 41 and the second robot 42 of the movable body 4 are operated by actuation of one or a plurality of actuators. The operation controller 15 of the processing execution portion 6 of the processing device 5 controls the actuation of the actuators configured to cause the first robot 41 and the second robot 42 of the movable body 4 to operate. Hence, the operation controller 15 controls the operations of the first robot 41 and the second robot 42 of the movable body 4. If the operations of the first robot 41 and the second robot 42 of the movable body 4 are controlled by the operation controller 15, the position and orientation of the connecting portion of the first robot 41 to the illumination portion 2 are adjusted, and the position and orientation of the connecting portion of the second robot 42 to the imaging portion 3 are adjusted. That is, if the position and orientation of the connecting portion of the first robot 41 to the illumination portion 2 are adjusted by the operation controller 15, the position and orientation of the illumination portion 2 are adjusted. In addition, if the position and orientation of the connecting portion of the second robot 42 to the imaging portion 3 are adjusted by the operation controller 15, the position and orientation of the imaging portion 3 are adjusted.

If a certain position of the subject S is to be captured by the imaging portion 3, the position is set to the imaging point, and the operation controller 15 controls the position and orientation of the illumination portion 2 such that the light beam from the illumination portion 2 illuminates the imaging point and its periphery, and also controls the position and orientation of the imaging portion 3 such that the angle of an optical axis O of the imaging portion 3 falls within a predetermined angle range with respect to the imaging point on the surface of the subject S. That is, the operation controller 15 controls the positions and orientations of the first robot 41 and the second robot 42 such that the imaging point where the subject S is illuminated by the illumination portion 2 and its neighborhood are captured by the imaging portion 3. The imaging portion 3 performs imaging by an imaging optical element such as a lens. In general, the imaging optical element focuses on a plane orthogonal to the optical axis O of the imaging optical element when performing imaging. Hence, in an example shown in FIG. 1, in imaging of the subject S, the operation controller 15 preferably adjusts the position and orientation of the imaging portion 3 to an orientation in which at least a part of the surface of the subject S within the angle-of-view range is orthogonal (at a right angle) to or almost at a right angle the optical axis O of the imaging portion 3. On the other hand, if the region where the optical axis O is orthogonal to the surface (that is, the normal direction to the surface coincides with the direction of the optical axis O) is not included in the angle-of-view range, there is no region to focus, and the clearness of the image is damaged.

An electrical signal generated by the image sensor of the imaging portion 3 is input to the image processing portion 13 of the processing execution portion 6 of the processing device 5. Hence, if the imaging portion 3 performs imaging, the image processing portion 13 acquires information concerning an image formed on the image sensor. Based on the electrical signal from the image sensor, the image processing portion 13 generates a captured image by the imaging portion 3 as an image within the imaging range of the imaging portion 3. The image processing portion 13 processes the image captured by the imaging portion 3, thereby executing operations and determination based on the captured image.

Note that in actual optical inspection by the optical inspection apparatus 1, the subject S is placed at a predetermined position in a predetermined orientation. However, the present invention is not limited to this, and the subject S may be moving.

Figure 3:
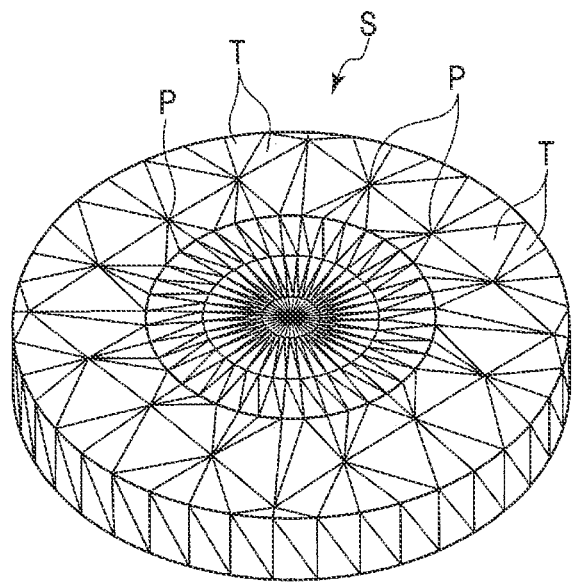
FIG. 3 is a schematic view showing an example of the shape data of the surface of a subject, which is stored in the data storage unit of a processing device according to the first embodiment.

Assuming that the subject S is placed at a predetermined position in a predetermined orientation, the data acquisition portion 11 of the processing execution portion 6 of the processing device 5 acquires the surface information of the subject S from the CAD data of the subject S. If the subject S is moving, the data acquisition portion 11 acquires, the surface information, from CAD data corresponding to the subject S at the position of certain time. FIG. 3 shows an example of the shape data of the surface of the subject S. In the example of FIG. 3, the shape data is shown in the STL (Standard Triangulated Language) format. In the shape data of the example shown in FIG. 3, the shape of the surface of the subject S is expressed by a point group formed by a number of points P. Also, in the shape data of the example shown in FIG. 3, the surface of the subject S is divided into a number of triangles T based on the point group. In each of a number of triangles T, three points of the point group, which correspond to the triangle, serve as the vertices. In the shape data of the example shown in FIG. 3, a position such as the three-dimensional position of each of the points P of the point group is shown as information concerning the position on the surface of the subject S. The shape data shows the normal vector of each of a number of triangles T as information concerning the position on the surface of the subject S.

Here, the normal vector is orthogonal to the surface of the subject S and is directed to the outside of the subject S. The normal vector is not illustrated in FIG. 3. Also, in the shape data, the surface of the subject S may be divided into a plurality of (a number of) polygons other than triangles and, for example, the surface of the subject S may be divided into a number of rectangles. In this case as well, the vertices of each polygon are formed by four or more points P of the point group, which correspond to the polygon. In the shape data, the normal vector of each of the plurality of polygons is shown as information concerning the position on the surface of the subject S.

The data acquisition portion 11 reads out the shape data of the subject S from the data storage unit 7 or via the user interface 8. Based on the shape data, the data acquisition portion 11 acquires information concerning the shape of the surface of the subject S in an inspection range. Also, for the information stored in the data storage unit 7 and/or the information set via the user interface 8, the data acquisition portion 11 acquires pieces of information such as a region (irradiation field) that can be illuminated by the illumination portion 2, a region (imaging irradiation field) that can be captured by the imaging portion 3, the distance between the imaging portion 3 and the subject S, the resolution of the imaging portion 3, and the positions and orientations in which the illumination portion 2, the imaging portion 3, and the movable body 4 can be arranged. That is, the data acquisition portion 11 acquires various kinds of information concerning the illumination portion 2, the imaging portion 3, and the movable body 4.

Based on the shape data of the subject S and the information concerning the imaging portion 3 and the movable body 4, the path calculation portion 12 of the processing execution portion 6 of the processing device 5 calculates the irradiation field and the imaging irradiation field based on the CAD data in the inspection range, and calculates the positional relationship between a plurality of imaging points to perform imaging, the illumination portion 2, and the imaging portion 3.

Figure 4:
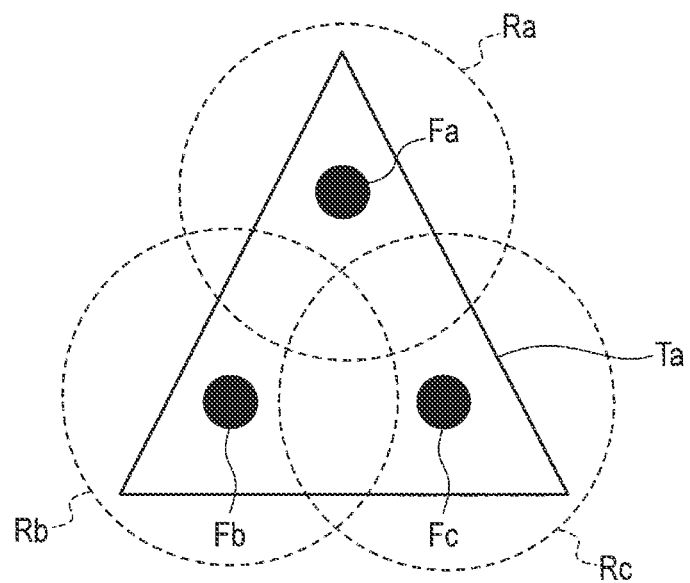
FIG. 4 is a schematic view for explaining an example of processing of setting (calculating) a plurality of imaging points, which is performed by the path calculation portion of the processing device according to the first embodiment.

In FIG. 4, an example of processing of setting (determining) a plurality of imaging points using the path calculation portion 12 will be described. In an example shown in FIG. 4, the path calculation portion 12 may set three imaging points Fa to Fc as a plurality of imaging points F from a preset inspection range on the surface of the subject S. Based on the irradiation field where the surface of the subject Is s irradiated with the light beam from the illumination portion 2, and the imaging irradiation field that can be captured by the imaging portion 3, the path calculation portion 12 defines an imaging range Ra at the imaging point Fa, an imaging range Rb at the imaging point Fb, and an imaging range Rc at the imaging point Fc. Irradiation field information can theoretically be calculated in advance by the path calculation portion 12 of the processing device 5 using the light beam information of the light beam emitted from the illumination portion 2 and the surface information of the subject S by CAD data, as will be described later. Also, the imaging irradiation field can logically be calculated in advance if the positional relationship between the imaging portion 3 and the subject S is known. Also, in the example shown in FIG. 4, a triangle Ta that is one of the triangles T arranged in the inspection range is shown. In the triangle Ta, any portion is included in one or more of the imaging ranges Ra to Rc. Hence, the path calculation portion 12 calculates the plurality of imaging points F such that any portion of the triangle Ta is captured at one or more of the imaging points Fa to Fc. In addition, for each of the triangles T other than the triangle Ta arranged in the inspection range as well, the path calculation portion 12 calculates the plurality of imaging points F such that any portion of the triangles T is captured at one or more of the plurality of imaging points F.

Also, in the example shown in FIG. 4, when calculating the imaging points Fa to Fc, the triangle Ta is divided into three polygons. The triangle Ta is divided such that each of the three polygons includes a corresponding one of the imaging points Fa to Fc. In addition, the triangle Ta is divided such that the center of gravity of each of the three polygons matches or almost matches a corresponding one of the imaging points Fa to Fc. As each of the imaging points Fa to Fc, the center of gravity of a corresponding one of the three polygons divided from the triangle Ta is thus calculated. When calculating the center of gravity of each of the divided polygons as a corresponding one of the imaging points, each imaging point is calculated using a centroidal Voronoi tessellation method, a known rectangle partition method, or the like.

In the inspection range of the subject S, a small-angular-difference portion in which the difference of the angle made by the normal direction to the surface of the subject S between the plurality of mutually neighboring triangles T is small or zero sometimes exists. Here, in a state in which the imaging portion 3 captures the subject S, the angle made by the optical axis O of the imaging portion 3 to the normal direction to the surface of the subject S may be adjusted in a predetermined angle range, as described above. That is, if the optical axis O coincides with the normal direction to the object surface as much as possible, an in-focus image can be acquired. In the small-angular-difference portion, the angular difference between the plurality of neighboring triangles T is, for example, several degrees even if not zero. In this case, in the small-angular-difference portion, for example, the angular difference of the surface of the subject S between the neighboring triangles T is small as compared to the size of the above-described predetermined angle range concerning the angle made by the optical axis O of the imaging portion 3 to the normal direction to the surface of the subject S. In addition, if the small-angular-difference portion exists in the inspection range, the plurality of imaging points are calculated assuming that the plurality of triangles T (polygons) arranged in the small-angular-difference portion are located to each other on the same plane. In an example, one or more of the plurality of imaging points are calculated and set based on one polygon formed by the plurality of triangles T arranged in the small-angular-difference portion. The plurality of imaging points are calculated such that, in the one polygon formed by the plurality of triangles T arranged in the small-angular-difference portion, any portion of the polygon is included in the imaging range at one or more of the plurality of imaging points.

Figure 5:
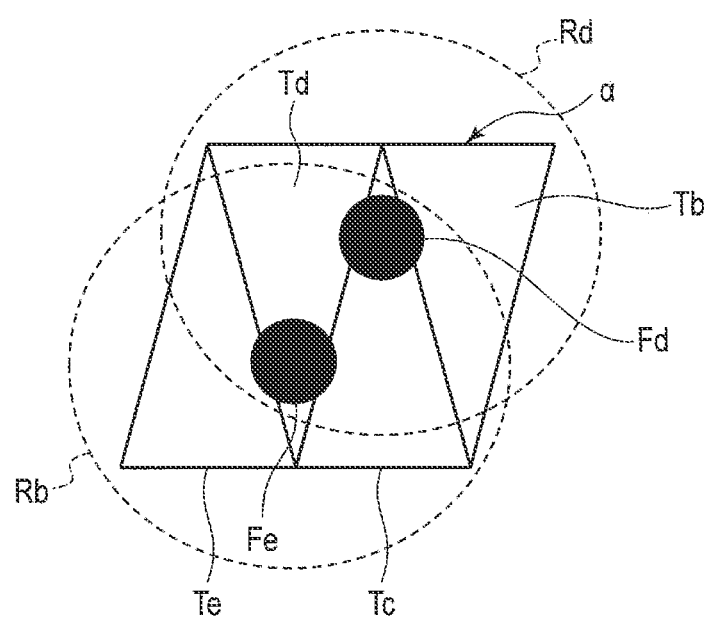
FIG. 5 is a schematic view for explaining an example of processing of setting (calculating) one or more of the plurality of imaging points based on one polygon formed from a plurality of triangles arranged in a small-angular-difference portion, which is performed by the path calculation portion of the processing device according to the first embodiment.

In FIG. 5, an example in which one or more of the plurality of imaging points are determined based on one polygon formed by the plurality of triangles T arranged in the small-angular-difference portion will be described. In an example shown in FIG. 5, four triangles Tb to Te are arranged in the small-angular-difference portion, and the difference of the angle made by the normal direction to the surface of the subject S between the triangles Tb to Te is small or zero. A polygon α is formed from the triangles Tb to Te arranged in the small-angular-difference portion. Also, in the example shown in FIG. 5, two imaging points Fd and Fe are at least calculated as the plurality of imaging points F, and the path calculation portion 12 sets the imaging points Fd and Fe based on the polygon. An imaging range Rd at the imaging point Fd and an imaging range Re at the imaging point Fe are then defined.

In the example shown in FIG. 5, any portion of the polygon α formed from the triangles Tb to Te is included in one or more of the imaging ranges Rd and Re. Hence, the plurality of imaging points F are calculated such that any portion of the polygon α is captured at one or more of the imaging points Fd and Fe. Also, in the example shown in FIG. 5, when calculating the imaging points Fd and Fe, the polygon α is divided into two polygons. The polygon α is divided such that each of the two polygons includes a corresponding one of the imaging points Fd and Fe. Like the calculation of the imaging points Fa to Fc described above, as each of the imaging points Fd and Fe, the center of gravity of a corresponding one of the two polygons divided from the polygon α is calculated.

For each of the plurality of imaging points F (positions on the surface of the subject s), the path calculation portion 12 calculates the position and orientation of the illumination portion 2 and the position and orientation of the imaging portion 3 based on the irradiation field of the illumination portion 2 and the imaging irradiation field of the imaging portion 3. That is, for each of the plurality of imaging points F, the path calculation portion 12 acquires the control information of the actuator of the first robot 41 and the control information of the actuator of the second robot 42. Note that the control information of the actuator of the first robot 41 and the control information of the actuator of the second robot 42 include the moving speeds, the moving timings, and the like of the illumination portion 2 and the imaging portion 3 in addition to the moving directions of these.

At each of the plurality of imaging points F, the path calculation portion 12 calculates, based on the calculated positions and orientations of the illumination portion 2 and the imaging portion 3, the positions and orientations of the connecting portions of the movable body 4 to the illumination portion 2 and the imaging portion 3 and the control amount of the movable body 4. Here, if a robot arm with one or more joints is the movable body 4, the angle of each joint can be used as the control amount of the movable body 4. If a linear motion mechanism is the movable body 4, a moving amount by the operation of the linear motion mechanism can be used as the control amount of the movable body 4.

When the illumination portion 2 and the imaging portion 3 move, the path calculation portion 12 calculates the irradiation field on the surface of the subject S illuminated with the light beam from the illumination portion 2 and imaging irradiation field information that can be captured by the imaging portion 3. The irradiation field information can be considered as information for deciding the positions and orientations of the illumination portion 2 and the imaging portion 3 and the control timings of the first robot 41 and the second robot 42 when performing optical inspection of the surface of a certain subject S by the optical inspection apparatus 1.

As described above, in the irradiation field information, the imaging irradiation field of the imaging portion 3 is included in the range of the irradiation field on the subject S illuminated by the illumination portion 2. Hence, a part of the portion of the subject S illuminated by the illumination portion 2 is the imaging irradiation field of the imaging portion 3.

Calculation of irradiation field information based on light beam information from the illumination portion 2 is performed using, for example, a ray tracing simulation. The ray tracing simulation is a method of geometric-optically theoretically calculating propagation of a light beam while considering the refraction or reflection of the light beam. To perform the ray tracing simulation, various commercially available software products are prepared. For example, the ray tracing simulation can be performed using LightTools® available from Synopsys. In this embodiment, the ray tracing simulation for the light beam from the illumination portion 2 is performed by the processing device 5. The ray tracing simulation for the light beam from the illumination portion 2 is performed by for example, the path calculation portion 12 in the processing device 5.

By the ray tracing simulation, how the illumination light strikes the surface of the subject S is theoretically calculated based on the position and orientation of the illumination portion 2. That is, the path calculation portion 12 can theoretically calculate the irradiation field on the surface of the subject S. In addition, when capturing, by the imaging portion 3, the imaging point in the irradiation field where the surface of the subject S is illuminated with the illumination light, the path calculation portion 12 theoretically calculates the position and orientation of the imaging portion 3 such that a clearest image contrast can be obtained. Hence, the path calculation portion 12 can theoretically determine, in advance, for example, the position and orientation of the illumination portion 2 and the position and orientation of the imaging portion 3 at certain time (certain timing) from the start of optical inspection.

Note that the position and orientation of the imaging portion 3 are optimized with respect to the imaging point in the irradiation field on the surface of the subject S if, for example, the optical axis O of the imaging portion 3 and the illumination direction of the illumination portion 2 hold a relationship of specular reflection with respect to the normal direction to the surface of the subject S. That is, this is a case where the angles made by the direction of the optical axis O of the imaging portion 3 and the illumination direction with respect to the normal direction to the surface of the subject S are equal. However, the positional relationship between these is not limited to this.

The operation controller 15 of the processing execution portion 6 of the processing device 5 acquires the paths to move the illumination portion 2 and the imaging portion 3, which are calculated by the path calculation portion 12. The operation controller 15 then controls the operation of the movable body 4 based on the paths, and moves the illumination portion 2 and the imaging portion 3 along the paths. In addition, the operation controller 15 controls the operation of the movable body 4, thereby adjusting the illumination portion 2 and the imaging portion 3 to the positions and orientations calculated by the path calculation portion 12 and acquiring a captured image including a desired imaging point. Then, for each of the imaging points, the illumination portion 2 in the calculated position and orientation illuminates the surface of the subject S, and the imaging portion 3 in the calculated position and orientation captures the surface of the subject S.

The image processing portion 13 of the processing execution portion 6 of the processing device 5 processes the image captured at each of the plurality of imaging points, and executes determination or the like for a defect on the surface of the subject S based on the captured image. If the image processing portion 13 performs defect determination, for example, images acquired at the imaging points of a subject that guarantees the absence of defects are stored in the data storage unit 7 in advance as reference images. The image processing portion 13 compares the image acquired at each imaging point on the surface of the subject S with the reference image, thereby determining whether a defect or the like exists in a desired range of the surface of the subject S.

The operation of the optical inspection apparatus 1 according to this embodiment will be described next.

Figure 6:
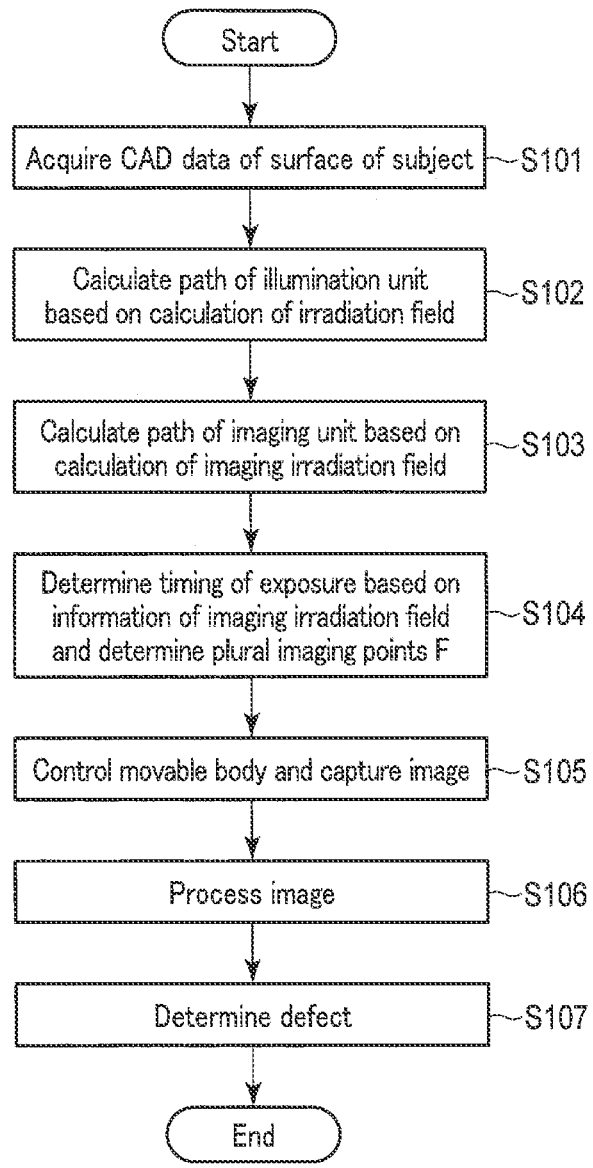
FIG. 6 is a flowchart schematically showing an example of processing executed by the processing execution portion of the processing device according to the first embodiment.
Figure 7:
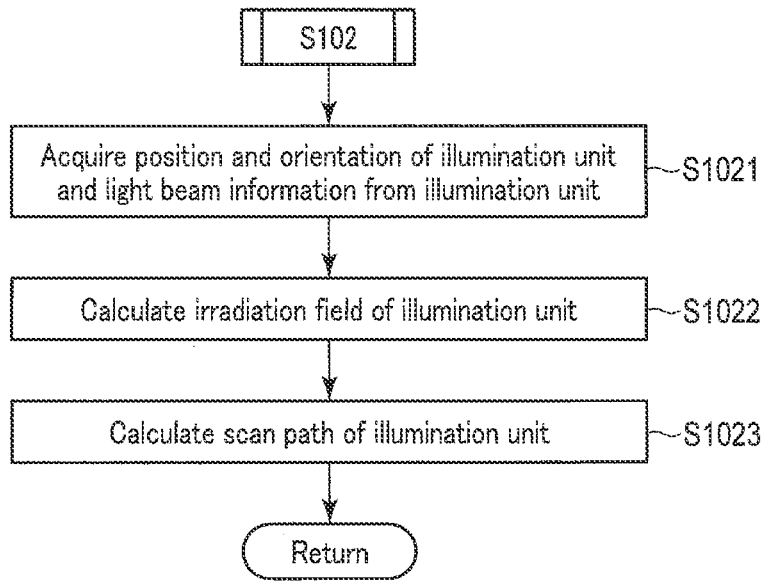
FIG. 7 is a flowchart showing a subroutine as an example of some processes shown in FIG. 6.
Figure 8:
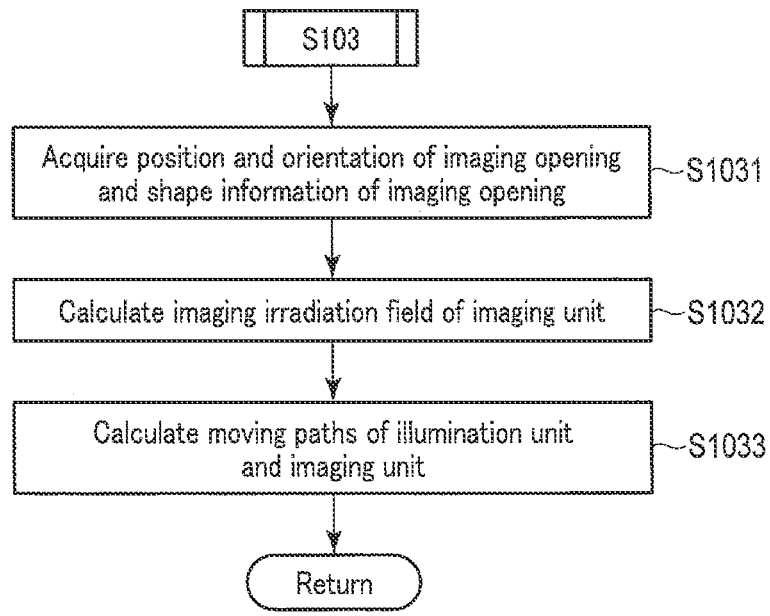
FIG. 8 is a flowchart showing a subroutine as an example of some processes shown in FIG. 6.

FIG. 6 shows an example of processing executed by the processing execution portion 6 of the processing device 5 according to this embodiment. FIGS. 7 and 8 each show a subroutine of some processes of the processing shown in FIG. 6.

The processing shown in FIG. 6 is executed once before optical inspection is executed for the surface of the subject S. If the processing shown in FIG. 6 is started, the data acquisition portion 11 assumes that the subject S is arranged at a predetermined position in a predetermined orientation in the optical inspection apparatus 1. If the subject S is moving, the position of the subject S is assumed to be determined at certain time. The data acquisition portion 11 acquires the CAD data of the subject S from the data storage unit 7 that stores the CAD data of the subject S in advance or via the user interface 8 (step S101). The data acquisition portion 11 acquires surface information on the CAD data of the subject S arranged in a desired orientation at the position where the subject S is assumed to be arranged at the time of optical inspection. That is, the data acquisition portion 11 acquires the shape data of the surface of the subject S, which is expressed by a number of point groups on the surface of the subject S.

The data acquisition portion 11 acquires a virtual movable range of the illumination portion 2 by the first robot 41, and a virtual movable range of the imaging portion 3 by the second robot 42. The virtual movable range of the illumination portion 2 by the first robot 41 includes the direction of the illumination light of the illumination portion 2. The virtual movable range of the imaging portion 3 by the second robot 42 includes the direction of the optical axis O of the imaging portion 3.

The path calculation portion 12 appropriately sets the first scan path D1 of the illumination portion 2 to the surface of the subject S. The position and orientation of the illumination portion 2 with respect to the subject S are determined by the first robot 41. The position and orientation of the illumination portion 2 here include the initial position of the illumination portion 2 in a predetermined range of the subject S and positions of the sequentially moved illumination portion 2. At this time, light beam information to the subject S is determined in correspondence with each position and orientation of the illumination portion 2 for the subject S. That is, a light beam group that enters the subject S is determined. The path calculation portion 12 calculates the irradiation field information of the illumination portion 2 using the CAD data of the subject S and the light beam information from the illumination portion 2 as an input, and calculates the scan path of the illumination portion 2 such that a whole desired imaging region on the surface of the subject S can be illuminated without omission (step S102). The irradiation field information at this time is calculated by the ray tracing simulation.

In step S102, the path calculation portion 12 of the processing device 5 executes the processing, for example, as shown in FIG. 7. The path calculation portion 12 acquires the position and orientation of the illumination portion 2 and the light beam information from the illumination portion 2 (step S1021). Based on the CAD data of the subject S, the position and orientation of the illumination portion 2, and the light beam information from the illumination portion 2, the path calculation portion 12 theoretically calculates the irradiation field information of the illumination portion 2 on the inspection target surface of the subject S (step S1022). Then, based on the irradiation field information of the illumination portion 2, the path calculation portion 12 calculates the scan path of the illumination portion 2 such that a whole desired imaging region on the surface of the subject S can be illuminated without omission (step S1023). At this time, the path calculation portion 12 can calculate a path to move the illumination portion 2 or paths to move the movable body 4 and the illumination portion 2.

As shown in FIG. 6, like the calculation of the irradiation field information, the path calculation portion 12 calculates the imaging irradiation field information (information concerning the imaging region) of the imaging portion 3 on the surface of the subject S using the CAD data of the subject S and the information (the opening, the angle of view, the position, and the orientation) of the imaging portion 3 as an input. In this way, in the optical inspection apparatus 1, the processing device 5 theoretically predicts the irradiation field information of the illumination portion 2 and the imaging irradiation field information of the imaging portion 3.

The path calculation portion 12 appropriately sets the second scan path D2 of the imaging portion 3 to the surface of the subject S in consideration of the relationship with the illumination portion 2. The path calculation portion 12 sets the second scan path D2 such that a whole desired imaging region is captured at least once in an illuminated state. At this time, the imaging irradiation field of the imaging portion 3 variously changes depending on the surface shape of the subject S. The path calculation portion 12 directs the optical axis O of the imaging portion 3 moved along the second scan path D2 to the irradiation field of the illumination portion 2 moved along the first scan path D1 and calculates the paths of the illumination portion 2 and the imaging portion 3 such that the imaging irradiation field is included (the imaging irradiation field exist) in the irradiation field (step S103).

That is, the path calculation portion 12 calculates the path of the imaging portion 3 such that a whole desired imaging range on the surface of the subject S is captured at least once in an illuminated state. Hence, the path calculation portion 12 calculates the path of the illumination portion 2 and the path of the imaging portion 3 based on the irradiation field information such that the imaging irradiation field covers the whole desired imaging region.

Also, in step S103, the path calculation portion 12 of the processing device 5 acquires the position and orientation of the imaging portion 3, and the position and shape information of the imaging opening of the imaging portion 3, for example, as shown in FIG. 8 (step S1031). Based on the irradiation field information of the illumination portion 2, the position and orientation of the imaging portion 3, and the position and shape information of the imaging opening of the imaging portion 3, the path calculation portion 12 theoretically calculates the imaging irradiation field information of the imaging portion 3 on the inspection target surface of the subject S (step S1032). The path calculation portion 12 then calculates the moving paths of the illumination portion 2 and the imaging portion 3 (step S1033).

Based on the theoretical calculation of the irradiation field information and the imaging irradiation field information using the shape data of the subject S, the path calculation portion 12 calculates the positions of the illumination portion 2 and the imaging portion 3 such that each imaging point is included in the captured image. After the irradiation field information is calculated using the CAD data, the path calculation portion 12 further calculates the imaging irradiation field, and obtains the imaging point F based on the imaging irradiation field information. If the imaging point F is determined, the timing of exposure of the imaging portion 3 can be calculated (step S104).

For each of the plurality of imaging points F, the path calculation portion 12 optimizes the position and orientation of the imaging portion 3 for capturing the subject S. For each of the plurality of imaging points, the path calculation portion 12 optimizes the normal direction to the surface of the subject S and the angle of the optical axis O of the imaging portion 3 with respect to the normal direction to the surface of the subject S, and performs position correction such that a clear image in focus can be acquired.

Note that the processes of steps S103 and S104 will be described more specifically. If the irradiation field of the illumination portion 2 obtained by the ray tracing simulation is the first irradiation field IF1, the path calculation portion 12 determines the position and orientation of the first robot 41 supporting the illumination portion 2 and the position and orientation of the second robot 42 supporting the imaging portion 3 such that the first imaging irradiation field PF1 of the imaging portion 3 exists in the range of the first irradiation field IF1. At this time, the position of the imaging opening of the imaging portion 3 is determined. For example, if the imaging optical element of the imaging portion 3 is a lens with an effective diameter φ of 40 mm, the imaging opening has a disc shape with a diameter φ of 40 mm. At this time, the first imaging irradiation field PF1 of the imaging portion 3 is also calculated by the ray tracing simulation. The direction of capturing the subject S (the orientation of the optical axis O of the imaging portion 3) can be optimized by setting the angle made by the normal direction to the surface of the subject S and the optical axis O of the imaging portion 3 with respect to the normal direction to the surface of the subject S within a predetermined angle range.

If the irradiation field information of the illumination portion 2 obtained by the ray tracing simulation is the second irradiation field IF2, the path calculation portion 12 determines the position and orientation of the first robot 41 supporting the illumination portion 2 and the position and orientation of the second robot 42 supporting the imaging portion 3 such that the second imaging irradiation field PF2 of the imaging portion 3 exists in the range of the second irradiation field IF2. That is, the imaging irradiation field information is calculated by the ray tracing simulation, and the positions and orientations of the illumination portion 2 and the imaging portion 3 are determined. The path calculation portion 12 calculates the paths of the illumination portion 2 and the imaging portion 3 such that the whole desired region can be captured by imaging at all the imaging points F (step S103).

Note that although the imaging portion 3 moves from the first imaging irradiation field PF1 to the second imaging irradiation field PF2, the illumination portion 2 can maintain the first irradiation field IF1.

For example, if a first image is acquired in the first imaging irradiation field PF1, a second image is acquired in the second imaging irradiation field PF2, and a seamless image without any gap can be acquired by connecting these images, these will be referred to as connectable images. To acquire connectable images, it is necessary that no skip exists between the first image in the first imaging irradiation field PF1 of the imaging portion 3 and the second image in the second imaging irradiation field PF2, and the first image and the second image may partially overlap. That is, pieces of mutually neighboring imaging irradiation field information may have overlap portions. This also applies to the irradiation field information of the illumination portion 2, and pieces of mutually neighboring irradiation field information may have overlap portions.

The path calculation portion 12 calculates the paths of the illumination portion 2 and the imaging portion 3 using the ray tracing simulation such that connectable images are acquired by imaging of the imaging portion 3 while illuminating all the imaging points F with the light beam of the illumination portion 2.

To acquire connectable images, the path calculation portion 12 calculates the imaging shutter timing (exposure timing) of the imaging portion 3 in addition to the paths along the first scan path D1 of the illumination portion 2 and the second scan path D2 of the imaging portion 3. That is, the path calculation portion 12 calculates the timing of capturing the imaging point F. In addition to the paths along the first scan path D1 of the illumination portion 2 and the second scan path D2 of the imaging portion 3, the path calculation portion 12 thus calculates scan time-series information in which the imaging shutter timings of the imaging portion 3 are time-serially arranged.

Hence, the path calculation portion 12 calculates the imaging timing (exposure timing) at which, for example, the imaging portion 3 releases the imaging shutter to expose the image sensor and acquire the first image. An example of the imaging timing at this time is a timing at which the imaging irradiation field information of the imaging portion 3 is the first imaging irradiation field PF1 while the first irradiation field IF1 is illuminated by the illumination portion 2. The path calculation portion 12 calculates the imaging timing such that the imaging portion 3 releases the imaging shutter at this imaging timing to expose the image sensor and acquire the first image.

Similarly, the path calculation portion 12 calculates the imaging timing at which, for example, the imaging portion 3 releases the imaging shutter to expose the image sensor and acquire the second image. An example of the imaging timing at this time is a timing at which the imaging irradiation field information of the imaging portion 3 is the second imaging irradiation field PF2 while the second irradiation field IF2 is illuminated by the illumination portion 2. The path calculation portion 12 calculates the imaging timing such that the imaging portion 3 releases the imaging shutter at this imaging timing to expose the image sensor and acquire the second image. At this time, the path calculation portion 12 calculates the imaging shutter timing of the imaging portion 3 in addition to the paths along the first scan path D1 of the illumination portion 2 and the second scan path D2 of the imaging portion 3.

Note that the size of the first imaging irradiation field PF1 of the first image and the size of the second imaging irradiation field PF2 of the second image may be equal to or different from each other.

Hence, before optical inspection of the subject S is actually performed, the path calculation portion 12 determines the scan paths (the paths for the illumination portion 2 and the imaging portion 3 to move) and the imaging timings to acquire whole connectable images of the surface of the subject S based on the irradiation field information of the illumination portion 2 and the imaging irradiation field information of the imaging portion 3 (step S104).

Next, the operation controller 15 of the optical inspection apparatus 1 moves the illumination portion 2, the imaging portion 3, and the movable body 4 (the first robot 41 and the second robot 42) with respect to the surface of the actual subject S, thereby performing optical inspection of the subject S. The operation controller 15 moves the illumination portion 2, the imaging portion 3, and the movable body 4 along the paths calculated by the path calculation portion 12. The operation controller 15 controls and moves the first robot 41 and the second robot 42. At the same time, the path calculation portion 12 sets the plurality of imaging points F, and images including the imaging points F are captured at the imaging timings on the path calculated by the path calculation portion 12, thereby acquiring connectable images.

As described above, based on the calculation results of the path calculation portion 12 concerning the paths to move the illumination portion 2 and the imaging portion 3 and the imaging shutter timing of the imaging portion 3, the operation controller 15 sequentially controls the operation of the movable body 4 such that the images including the plurality of imaging points F are acquired (step S105), Thus, the operation controller 15 moves the illumination portion 2 and the imaging portion 3 along the paths calculated by the path calculation portion 12, and adjusts the positions and orientations of the illumination portion 2 and the imaging portion 3 when capturing an image including the imaging point F. Also, in a state in which the illumination portion 2 and the imaging portion 3 are moving along the calculated paths, the operation controller 15 causes the imaging portion 3 to capture each imaging point F on the surface of the subject S illuminated by the illumination portion 2.

Then, the image processing portion 13 captures the images including the plurality of imaging points F, and processes the images (step S106).

Based on the images including the imaging points F, and the like, the image processing portion 13 determines a defect or the like on the surface of the subject S (step S107). For example, the image processing portion 13 acquires an image of a standard surface without any flaw or the like on the surface of the subject S in advance, and stores the image in, for example, the data storage unit 7. The image processing portion 13 compares the image of the standard surface with a captured image, thereby determining the presence/absence of a defect or the like.

In this embodiment, the processing device 5 can calculate the irradiation field information of the illumination portion 2 by the ray tracing simulation based on the CAD data of the surface of the subject S, calculate, by the ray tracing simulation, the imaging irradiation field information that can be captured by the imaging portion 3, and set the scan paths of the illumination portion 2 and the imaging portion 3 and the imaging timings to acquire the images including the imaging points F. As described above, if optical inspection of the surface of the subject S is performed by the optical inspection apparatus 1 based on the paths and the imaging timings calculated by the processing device 5, the processing device 5 can acquire connectable images including a whole desired inspection region.

According to the optical inspection apparatus 1 of this embodiment, if the surface of the subject S is irradiated with a light beam from an illumination device on, for example, a ceiling, a position (imaging point) that is difficult to capture because of a shade on the surface of the subject S generated by the first robot 41 or the second robot 42 shielding the light beam can be captured. That is, it is possible to prevent a region that cannot be acquired as an image from being unintentionally generated on the surface of the subject S.

If optical inspection of the optical inspection apparatus 1 according to this embodiment is used, an image of the surface of the subject S can be acquired under the same imaging conditions. Hence, the optical inspection apparatus 1 according to this embodiment can perform optical inspection of the same quality for a plurality of subjects S without considering, for example, the influence of the arrangement of robots and the like which can form a shade on the surface of the subject S.

If optical inspection of the optical inspection apparatus 1 according to this embodiment is used, the scan paths of the imaging portion 3 and the illumination portion 2 need not be determined by actual imaging using the actual subject S, and the scan paths can be set from the CAD information of the subject S in advance.

Note that it can be said that if the irradiation field information and the imaging irradiation field information cannot be theoretically predicted in advance, as described above, scan time-series information used to acquire the whole connectable images of the surface of the subject S cannot be determined in advance. That is, scan time-series information used to acquire the whole connectable images without an image skip can be decided only when the irradiation field information and the imaging irradiation field information are determined by the optical inspection apparatus 1 according to this embodiment.

An optical inspection method (optical inspection program) according to this embodiment includes calculating irradiation field information concerning an irradiation field on the surface of the subject S when irradiating the surface of the subject S with a light beam from the illumination portion 2 that is supported by the movable body 4 and moved, and performing path calculation processing of calculating, based on the irradiation field information, a path for the illumination portion 2 to move or paths for the movable body 4 and the illumination portion 2 to move. By this method (program), the path for the illumination portion 2 to move or the paths for the movable body 4 and the illumination portion 2 to move can be calculated such that a desired range of the surface of the subject S is illuminated, for example, at least once. By this method, in a state in which an imaging point set in the desired range of the surface of the subject S is illuminated, the imaging portion 3 captures the position illuminated with the light beam, thereby performing visual inspection of the surface of, for example, the three-dimensional subject S. If the irradiation field on the surface of the subject S is captured by the imaging portion 3, the positional relationship between the illumination portion 2 and the imaging portion 3 can be optimized, and an excellent image can be obtained. Since illumination is done by appropriately moving the illumination portion 2, it is possible to prevent each image from partially missing due to the influence of, for example, the shade of a robot or the like.

In the optical inspection method, the irradiation field information includes information concerning an imaging irradiation field where the surface of the subject S can be captured, using the light beam that is emitted from the moving illumination portion 2 and reflected by the surface of the subject S, by the imaging portion 3 that is supported by the movable body 4 and moved. The calculating the path by the path calculation portion includes calculating, based on the irradiation field information, the path of the movable body 4, the illumination portion 2, and the imaging portion 3 to move. Hence, if the paths of the illumination portion 2 and the imaging portion 3 are calculated based on the irradiation field information, a desired imaging point on the surface of the subject S can be captured by the imaging portion 3. It is therefore possible to perform visual inspection of the surface of, for example, the three-dimensional subject S using the optical inspection method. At this time, the range illuminated by the illumination portion 2 is captured by the imaging portion 3. For this reason, an excellent image can be obtained in a state in which the surface of the subject S is illuminated with light suitable for imaging, and the inspection accuracy can be improved.

The calculating the path by the path calculation portion includes generating a timing of exposure for capturing an image by the imaging portion 3. Also, generating the timing of exposure includes operating at least one of a shutter of the imaging portion 3 and ON/OFF of the illumination portion 2. Hence, as the method of acquiring an image by the imaging portion 3, various methods can be used.

The optical inspection method includes acquiring shape data of the surface of the subject S expressed by a number of point groups on the surface of the subject S, and determining the imaging point of the imaging portion 3 based on the shape data of the surface of the subject S. If the paths to move the movable body 4, the illumination portion 2, and the imaging portion 3 are set to connect images including imaging points, an image in a predetermined range, for example, in a whole range can be acquired. For this reason, if an image obtained at each imaging point by optical inspection is compared with, for example, an image of a standard surface, the result of optical inspection for the surface of the subject S can be obtained.

In the optical inspection method, the calculating the path includes maintaining a state in which an imaging region of the imaging portion 3 is included in the irradiation field of the illumination portion 2 independently of the position and orientation of the movable body 4. If the connecting portion and the imaging region maintain such a relationship, the image at the imaging point on the surface of the subject S can be obtained in an illuminated state.

Note that the distance between the imaging opening of the imaging portion 3 and the arbitrary imaging point F on the surface of the subject S is calculated by the path calculation portion 12 of the processing device 5. In some cases, the distance between the imaging opening of the imaging portion 3 and the imaging point F on the surface of the subject S is preferably an equidistance. If the distance between the imaging opening of the imaging portion 3 and the surface of the subject S is maintained in a predetermined equidistance, the imaging distance of the imaging portion 3 can be maintained in a predetermined state. That is, an in-focus state can always be obtained. If the path calculation portion 12 calculates the path such that the distance between the imaging opening and each imaging point F becomes an equidistance, the processing device 5 can move the second robot 42 by the operation controller 15 while maintaining the distance between the imaging opening of the imaging portion 3 and the certain imaging point F on the surface of the subject S. If the imaging portion 3 always ensures the imaging distance capable of acquiring a clear image, the optical inspection apparatus 1 can obtain a clear image.

The path of the imaging portion 3, which is set by the path calculation portion 12, is preferably set such that, for example, the path passes through all of the plurality of imaging points and minimizes the sum of moving costs from each of the plurality of imaging points to an imaging point as the next moving destination. Calculation of the path that minimizes the sum of moving costs by the path calculation portion 12 using the processing device (processor) 5 is performed by various methods, and a description thereof will be omitted here.

As for the path calculated by the path calculation portion 12, to suppress the moving costs of the first robot 41 and the second robot 42, it is preferable that, for example, the optical axis O of the imaging portion 3 does not pass through the same imaging point a plurality of times. The path calculation portion 12 may calculate the path such that the optical axis O of the imaging portion 3 passes through the same imaging point a plurality of times, as needed.

As described above, according to this embodiment, it is possible to provide the optical inspection method capable of performing, in surface inspection of the subject S, optical inspection without oversight (image missing) in a desired range, the non-transitory storage medium storing the optical inspection program, the processing device 5, and the optical inspection apparatus 1.

(Modification)

Figure 9:
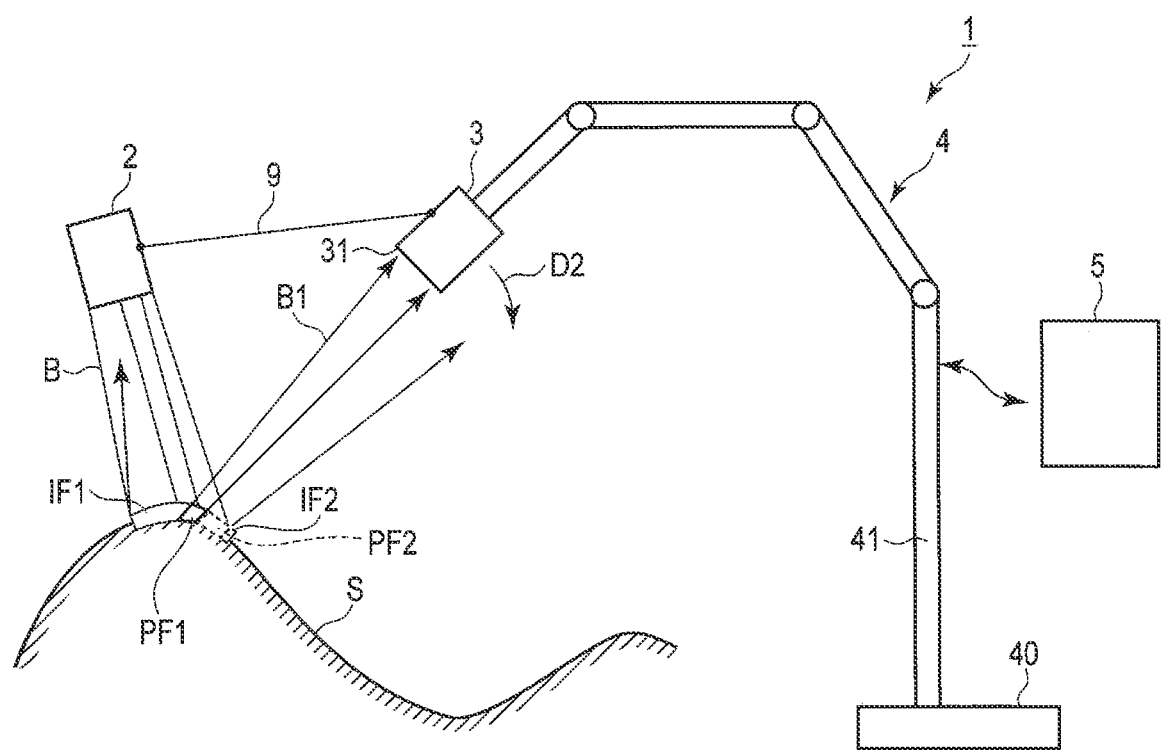
FIG. 9 is a schematic view showing an optical inspection apparatus according to a modification of the first embodiment.

The optical inspection apparatus 1 according to the modification of the first embodiment will be described with reference to FIG. 9.

In this modification, the movable body 4 includes the base 40, and one robot (for example, the first robot 41) supported on the base 40. The illumination portion 2 and the imaging portion 3 are connected by a connecting portion 9. Hence, the illumination portion 2 and the imaging portion 3 are integrally moved by the movable body 4. For example, if the imaging portion 3 is moved to the second scan path D2, the illumination portion 2 moves interlockingly.

Note that the processing device 5 acquires irradiation field information by the ray tracing simulation based on the movable range of the movable body 4, and calculates the paths of the illumination portion 2 and the imaging portion 3, as described above in the first embodiment. If the irradiation field information is acquired by the ray tracing simulation, the positional relationship between the illumination portion 2 and the imaging portion 3 is reflected.

By the optical inspection apparatus 1 according to the modification, the number of robots configured to move the illumination portion 2 and the imaging portion 3 can be decreased as compared to the optical inspection apparatus 1 according to the first embodiment.

According to this modification, the optical inspection method (optical inspection program) can be executed in accordance with the flowcharts shown in FIGS. 6, 7, and 8. Hence, according to this modification, it is possible to provide the optical inspection method capable of performing, in surface inspection of the subject S, optical inspection without oversight (image missing) in a desired range, the non-transitory storage medium storing the optical inspection program, the processing device 5, and the optical inspection apparatus 1.

Second Embodiment

An optical inspection apparatus 1 according to the second embodiment will be described with reference to FIG. 10. This embodiment is another modification of the first embodiment including the modification. The same reference numerals as in the first embodiment denote the same members or members having the same functions, and a detailed description thereof will be omitted.

In the optical inspection apparatus 1 shown in FIG. 10, a movable body 4 and a processing device 5 are not illustrated. An illumination portion 2 and an imaging portion 3 of the optical inspection apparatus 1 according to this embodiment maintain a predetermined positional relationship. The movable body 4 integrally moves the illumination portion 2 and the imaging portion 3.

The imaging portion 3 includes a lens 31 and an image sensor 32. The image sensor 32 is arranged on an optical axis O of the lens 31. The lens 31 forms an image of a light beam B1 on the image sensor 32. An imaging opening is the effective region of the lens 31. That is, the imaging opening has a disc shape, and the diameter of the imaging opening is the effective diameter of the lens 31.

The illumination portion 2 includes a beam splitter 21 arranged, for example, between the lens 31 and the image sensor 32. Note that the beam splitter 21 may be located between the lens 31 and the surface of a subject S.

A light beam B from the illumination portion 2 irradiates the surface of the subject S along the optical axis O via the beam splitter 21 arranged, for example, between the lens 31 and the image sensor 32. That is, the beam splitter 21 changes the direction of the light beam B from the illumination portion 2 to irradiate the surface of the subject S along the optical axis O. This illumination method is called coaxial lighting.

The light beam B from the illumination portion 2 changes its direction via the beam splitter 21 and irradiates the surface of the subject S via the lens 31. Some components of the light beam B with which the surface of the subject S is irradiated are reflected by the surface of the subject S. The intensity direction distribution of the light beam B1 reflected by the surface of the subject S can be represented by a BRDF (Bidirectional Reflectance Distribution Function). The BRDF is an amount depending on the direction of a normal N to the surface of the subject s and an illumination direction (incidence direction to an object) L of illumination. If the BRDF can be obtained, an imaging irradiation field PF of the imaging portion 3 can theoretically be calculated based on geometric optics. Calculating the imaging irradiation field PF using the BRDF is also a kind of ray tracing simulation.

If the illumination of coaxial lighting is used, the illumination portion 2 and the imaging portion 3 can be made integrated and compact.

In this embodiment, a state in which the imaging region of the imaging portion 3 falls within the range of an irradiation field IF of the illumination portion 2 can be maintained independently of the positions of the illumination portion 2 and the imaging portion 3. A path calculation portion 12 calculates a path such that, for example, the optical axis O of the imaging portion 3 passes through each imaging point F. In this case, it is possible to acquire, at each imaging point F, an image illuminated with illumination light while facilitating control of the movable body 4.

According to this embodiment, the light beam B from the illumination portion 2 and the optical axis O of the imaging portion 3 are coaxial. The light beam B from the illumination portion 2 and the normal N at a certain imaging point F on the surface of the subject S can be made coaxial. Hence, by fixing the positional relationship between the illumination portion 2 and the imaging portion 3 with respect to the movable body 4 (one robot 41), the processing device 5 can calculate the irradiation field IF and the imaging irradiation field PF based on light beam information from the illumination portion 2 and the direction of the normal N at each imaging point F on the surface information (CAD data) of the subject S. Based on the calculated information of the irradiation field IF and the imaging irradiation field PF, the processing device 5 decides scan time-series information used to acquire whole connectable images of the surface of the subject S.

Here, to move the first robot 41 and a second robot 42 described in the first embodiment, it is necessary to control to fit the entire imaging region of the imaging portion 3 in the irradiation field of the illumination portion 2 while the imaging portion 3 preferably maintains a predetermined distance to the surface of the subject S. Also, to fix the imaging portion 3 to the first robot 41 described in the modification of the first embodiment and connect the illumination portion 2 to the imaging portion 3, it is necessary to control to fit the entire imaging region of the imaging portion 3 in the irradiation field of the illumination portion 2 and separate the illumination portion 2 from the subject S while the imaging portion 3 preferably maintains a predetermined distance to the surface of the subject S.

On the other hand, in this embodiment, it is possible to fit the entire imaging region of the imaging portion 3 in the irradiation field IF of the light beam B of the illumination portion 2. For this reason, according to this embodiment, the imaging portion 3 can easily capture the imaging irradiation field PF including the desired imaging point F in a state in which the illumination portion 2 sets the desired imaging point F and its periphery to the irradiation field IF. In addition, focus on the periphery of the imaging point F can be obtained by making the optical axis of the imaging portion 3 match the normal direction of the imaging point F. Hence, if the optical inspection apparatus 1 according to this embodiment is used, it is possible to obtain an excellent image used to judge the presence/absence of unevenness such as a flaw generated on the surface of the subject S.

According to this embodiment, the optical inspection method (optical inspection program) can be executed in accordance with the flowcharts shown in FIGS. 6, 7, and 8. Hence, according to this embodiment, it is possible to provide the optical inspection method capable of performing, in surface inspection of the subject S, optical inspection without oversight (image missing) in a desired range, the non-transitory storage medium storing the optical inspection program, the processing device 5, and the optical inspection apparatus 1.

(First Modification)

Figure 11:
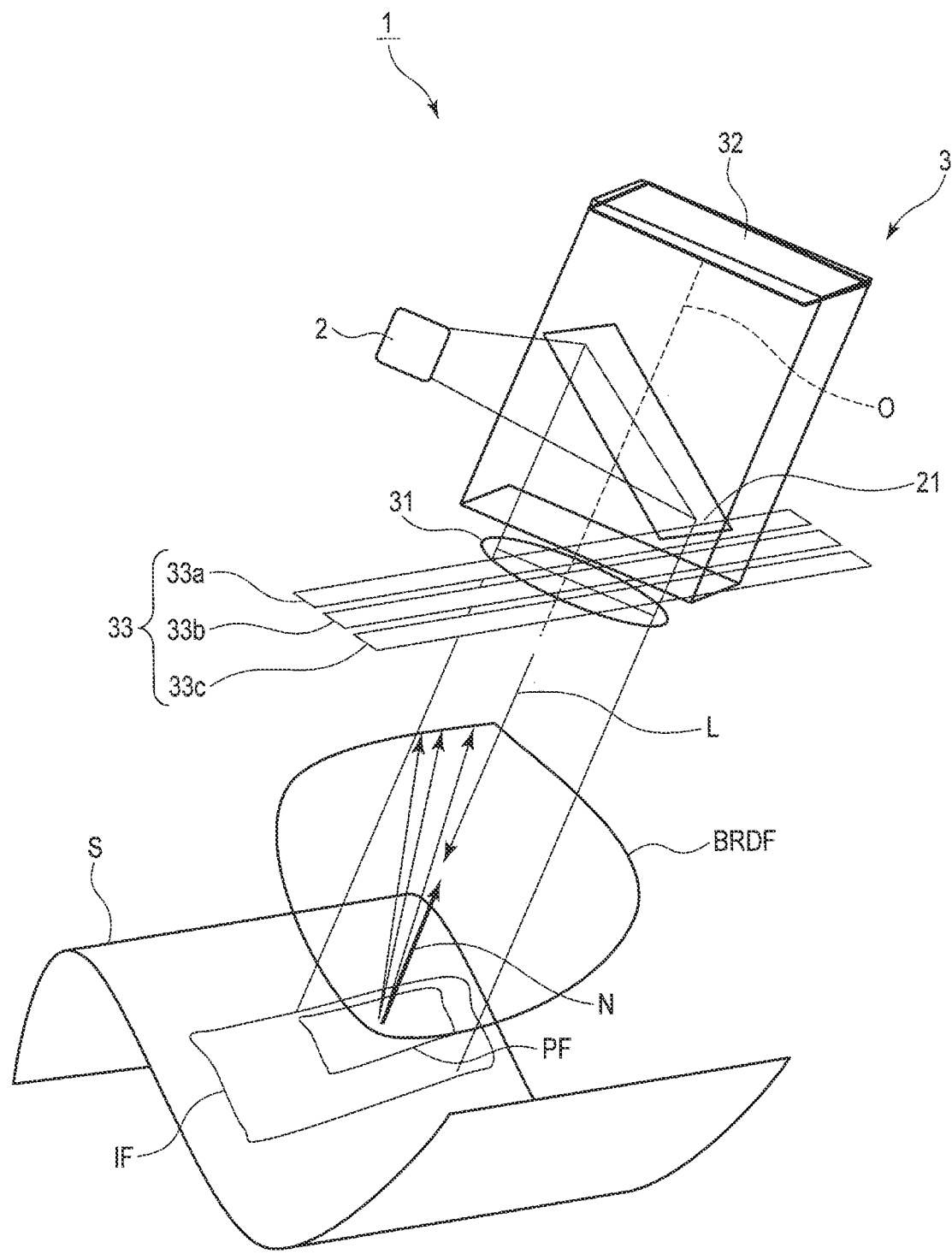
FIG. 11 is a schematic view showing an optical inspection apparatus according to the first modification of the second embodiment.

The first modification of the second embodiment will be described with reference to FIG. 11. FIG. 11 shows the optical inspection apparatus 1 according to the first modification of the second embodiment.

The imaging portion 3 of the optical inspection apparatus 1 according to this modification further includes a multiwavelength opening 33. The multiwavelength opening 33 includes a plurality of wavelength selection regions 33a, 33b, and 33c that are juxtaposed. If the light beam B1 reflected by the object S passes through the wavelength selection regions 33a, 33b, and 33c, it changes to a light beam having a specific wavelength region in accordance with the wavelength selection regions 33a, 33b, and 33c the light beam has passed through. For example, assume that the multiwavelength opening 33 includes the three wavelength selection regions 33a, 33b, and 33c. If the white light beam B1 passes through the three wavelength selection regions 33a, 33b, and 33c, the wavelength regions are assumed to range from 450 nm to 500 nm, from 500 nm to 600 nm, and from 600 nm to 750 nm. That is, the white light is changed to blue light, green light, and red light by the three wavelength selection regions 33a, 33b, and 33c of the multiwavelength opening 33. However, the wavelengths are not limited to these and can appropriately be set by selecting the wavelength selection region.

The light beam B from the illumination portion 2 irradiates the surface of the subject S along the optical axis O via the beam splitter 21. As described above, the intensity direction distribution of the light beam B1 reflected by the subject S can be represented by a BRDF (Bidirectional Reflectance Distribution Function). The BRDF is an amount depending on the direction of the normal N to the surface of the subject S and the illumination direction (incidence direction to an object) L of illumination. If the BRDF can be obtained, the imaging irradiation field PF can theoretically be calculated based on geometric optics. Calculating the imaging irradiation field PF using the BRDF is also a kind of ray tracing simulation.

Also, if the BRDF can be obtained, which one of the wavelength selection regions 33a, 33b, and 33c of the multiwavelength opening 33 passes the light beam B1 can be found. Hence, the processing device 5 can calculate the color distribution of an image captured by the image sensor 32.

The BRDF greatly changes depending on the presence/absence of small unevenness on the surface of the subject S. Hence, the color distribution of the captured image greatly changes depending on the presence/absence of small unevenness on the surface of the subject S. The color distribution of the captured image to the surface of the subject S when a small defect is absent is theoretically calculated in advance as a reference (standard surface). Using the reference, a small defect can be identified by calculating the difference of the color distribution of the captured image from the reference. Note that as the reference, an image acquired by the image sensor 32 may be used.

In this modification, illumination light of the illumination portion 2 enters the multiwavelength opening 33 via the beam splitter 21 and the lens 31. Hence, light having a predetermined wavelength, which has passed through the multiwavelength opening 33, enters a predetermined range of the subject S.

According to this modification, the optical inspection method (optical inspection program) can be executed in accordance with the flowcharts shown in FIGS. 6, 7, and 8.

Here, the optical inspection method includes acquiring an image via the imaging portion 3 including the multiwavelength opening 33 in which a light beam that has passed through each of the regions 33a, 33b, and 33c changes to the light beam B1 having a specific wavelength spectrum. It is therefore possible to easily inspect, by, for example, image processing, whether the surface of the subject S is normal or not.

According to this modification, it is possible to provide the optical inspection method capable of performing, in surface inspection of the subject S, optical inspection without oversight (image missing) in a desired range, the non-transitory storage medium storing the optical inspection program, the processing device 5, and the optical inspection apparatus 1.

(Second Modification)

Figure 12:
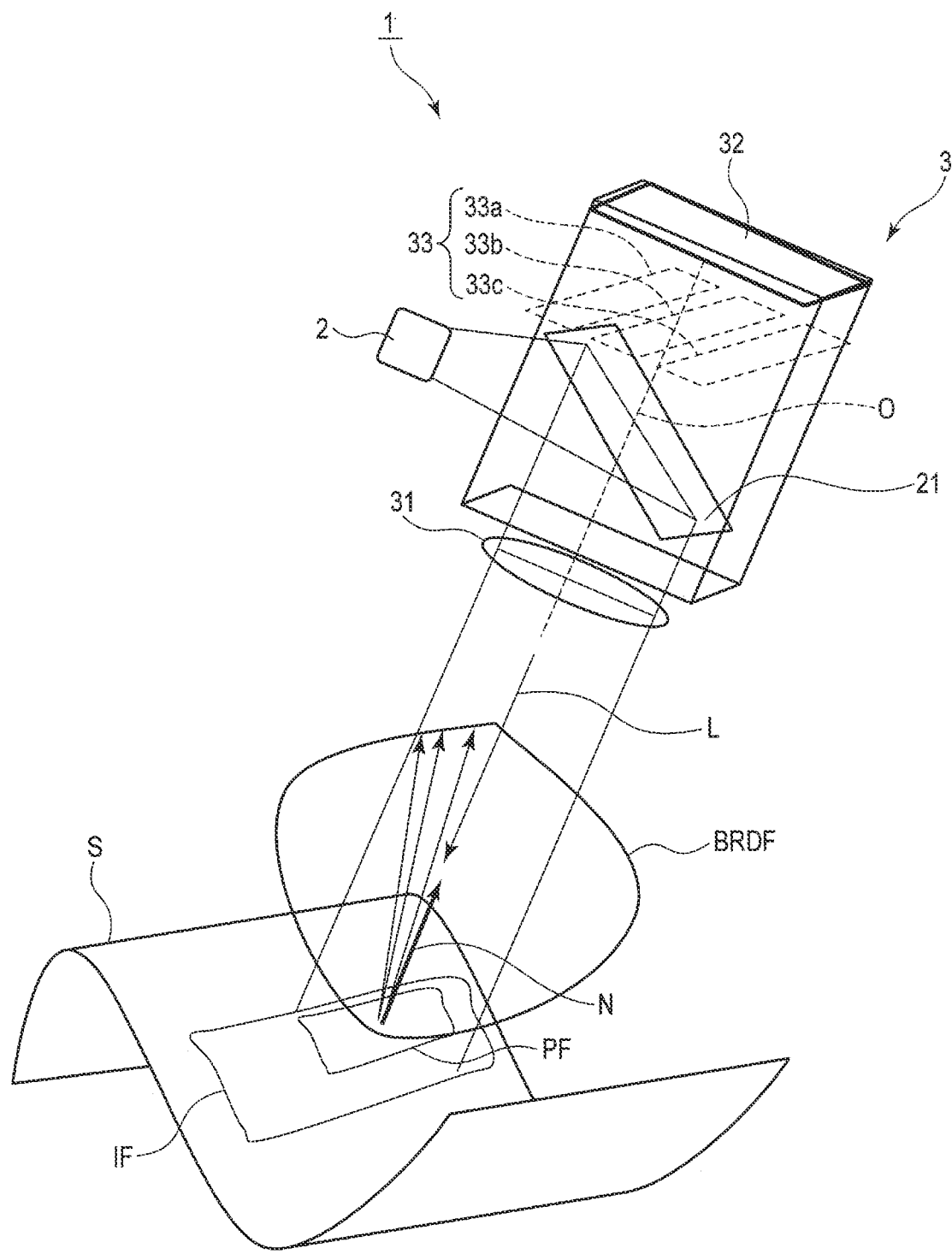
FIG. 12 is a schematic view showing an optical inspection apparatus according to the second modification of the second embodiment.

The second modification of the second embodiment will be described with reference to FIG. 12. FIG. 12 shows the optical inspection apparatus 1 according to the second modification of the second embodiment. This modification is another modification of the first modification of the second embodiment. The same reference numerals as in the first modification denote the same members or members having the same functions, and a detailed description thereof will be omitted.

Concerning the optical inspection apparatus 1 according to the first modification of the second embodiment shown in FIG. 11, an example in which the multiwavelength opening 33 is arranged immediately before the lens 31 has been described. That is, the multiwavelength opening 33 is arranged between the lens 31 and the surface of the subject S. The arrangement of the multiwavelength opening 33 is not limited to this, and the multiwavelength opening 33 can be arranged at any position with respect to the lens 31, For example, like the optical inspection apparatus 1 according to this modification shown in FIG. 12, the multiwavelength opening 33 may be arranged on the focal plane of the lens 31. In this case, if the imaging portion 3 forms an image from an object point on the surface of the subject S to an imaging point on the image sensor, a predetermined relationship can be held between the light beam direction and the color of the light beam independently of the object point (for example, see Hiroshi Ohno, "One-shot color mapping imaging system of light direction extracted from a surface BRDF," OSA Continuum 3 (12) (2020).).

Note that, for example, the position of the illumination portion 2 may be shifted to a position close to the surface of the subject S, and the beam splitter 21 may be arranged between the multiwavelength opening 33 and the object S. The illumination direction L of illumination in the optical inspection apparatus 1 is set to the same state as shown in FIG. 11. Even if the optical inspection apparatus 1 according to this modification shown in FIG. 12 is formed in this way, optical inspection can be performed like the optical inspection apparatus 1 shown in FIG. 11.

According to at least one embodiment described above, it is possible to provide the optical inspection method capable of performing, in surface inspection of the subject S, optical inspection without oversight (image missing) in a desired range, the non-transitory storage medium storing the optical inspection program, the processing device 5, and the optical inspection apparatus 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions,

What is claimed is:

1. An optical inspection method comprising:
    calculating irradiation field information concerning an irradiation field on a surface of a subject when irradiating the surface of the subject with a light beam from an illumination device that is supported by a movable body and moved; and
    performing path calculation processing of calculating, based on the irradiation field information, a path for the illumination device to move.

2. The method according to claim 1, wherein
    the irradiation field information includes information concerning an imaging irradiation field where the surface of the subject can be captured by a moving imaging device, and
    the path calculation processing includes calculating, based on the irradiation field information, a moving path of the illumination device supported by the movable body and a moving path of the imaging device.

3. The method according to claim 2, wherein the imaging device is supported by the movable body.

4. The method according to claim 2, wherein the path calculation processing includes, when calculating the paths of the illumination device and the imaging device, calculating a timing of exposure in capturing an image by the imaging device.

5. The method according to claim 4, wherein calculating the timing of exposure includes calculating a timing of operating at least one of a shutter of the imaging device and ON/OFF of the illumination device.

6. The method according to claim 2, further comprising:
    acquiring shape data of the surface of the subject expressed by a number of point groups on the surface of the subject; and
    calculating an imaging point of the imaging device based on the shape data.

7. The method according to claim 2, wherein the path calculation processing includes, when calculating the paths of the illumination device and the imaging device, calculating a position and orientation of the movable body such that the imaging irradiation field of the imaging device exists in the irradiation field of the illumination device.

8. The method according to claim 2, further comprising acquiring a captured image by the imaging device including a multiwavelength opening which includes a plurality of wavelength selection regions and in which a light beam that has passed through the wavelength selection regions changes to light beams having wavelength spectra different from each other.

9. A non-transitory storage medium storing an optical inspection program, the program causing a computer to execute:
    causing the computer to calculate irradiation field information concerning an irradiation field on a surface of a subject when irradiating the surface of the subject with a light beam from an illumination device that is supported by a movable body and moved; and
    causing the computer to calculate, based on the irradiation field information, a path to move the illumination device.

10. A processing device concerning optical inspection of a surface of a subject using a movable body and an illumination device supported by the movable body, comprising:
    a processor configured to:
    calculate irradiation field information concerning an irradiation field on the surface of the subject when irradiating the surface of the subject with a light beam from the illumination device that is supported by the movable body and moved; and
    calculate, based on the irradiation field information, a path to move the illumination device.

11. An optical inspection apparatus comprising:
    a processing device defined in claim 10;
    a movable body controlled by the processing device; and
    an illumination device supported by the movable body and configured to emit illumination light under control of the processing device, whose irradiation field information on a surface of a subject is calculated by the processing device.

12. The apparatus according to claim 11, further comprising an imaging device configured to, after the illumination device irradiates the surface of the subject, capture an image by a light beam reflected by the surface of the subject,
    wherein the irradiation field information includes information concerning an imaging irradiation field in which, after the illumination device irradiates the surface of the subject, the light beam reflected by the surface of the surface enters the imaging device.

13. The apparatus according to claim 12, wherein the imaging device comprises a multiwavelength opening which includes a plurality of wavelength selection regions and in which the light beam that has passed through the wavelength selection regions changes to light beams having wavelength spectra different from each other.

14. The apparatus according to claim 12, wherein the movable body integrally moves the illumination device and the imaging device.

* * * * *